Figure 1:
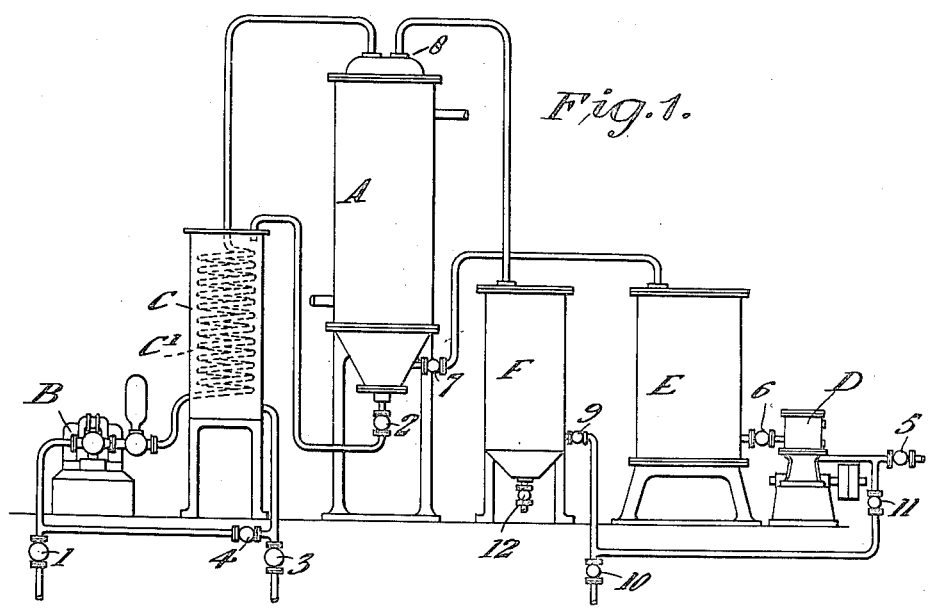

R. LESSING.
HYDROGENATION OF UNSATURATED SUBSTANCES.
APPLICATION FILED JULY 31, 1913.

1,162,623.

Patented Nov. 30, 1915.

Witnesses:
M. E. McDade.

Inventor
Rudolf Lessing
by
Attorney

UNITED STATES PATENT OFFICE.

RUDOLF LESSING, OF LONDON, ENGLAND.

HYDROGENATION OF UNSATURATED SUBSTANCES.

1,162,623.  Specification of Letters Patent.  Patented Nov. 30, 1915.

Application filed July 31, 1913. Serial No. 782,361.

*To all whom it may concern:*

Be it known that I, RUDOLF LESSING, a subject of the King of Great Britain, residing in London, and whose post-office address is Southampton House, 317 High Holborn, London, W. C., England, have invented certain new and useful Improvements in the Hydrogenation of Unsaturated Substances, of which the following is a specification.

It is known that organic compounds may be hydrogenated by heating them together with hydrogen gas and in contact with catalytic substances among which metallic nickel has been found to be particularly suitable. It is usual to mix the finely divided metal thoroughly with the substance to be treated, and then to bring hydrogen or gases containing hydrogen into contact with the mixture.

The present invention consists in subjecting the substance to be hydrogenated to the action of hydrogen or a hydrogenating agent, that is to say a gas containing hydrogen at a suitable temperature in the presence of a metallic compound which is decomposed at that temperature with liberation of metal. For instance a mixture of hydrogen and a suitable vaporous or gaseous metallic compound may be brought into contact with the substance under suitable conditions of temperature and pressure. Thus I have found that a great number of substances may be hydrogenated by treating them at elevated temperature with hydrogen to which a metallic carbonyl vapor, or gas containing a metallic carbonyl has previously been added; or with a mixture of gases, containing hydrogen in which metal carbonyl has been formed by combination of carbon monoxid, originally in the mixture, with a metal. The rapidity with which the hydrogenation proceeds under these conditions may be explained as the effect of the liberation of elementary metal, the properties of which "*in statu nascendi*" are known to be very different from those of metal which is merely finely subdivided.

It has already been proposed to use as the catalyzer finely subdivided nickel made by decomposing nickel carbonyl in the heated material prior to the introduction of the hydrogenating gas. It was not known, however, that considerable technical advantages accrue from conveying the nickel carbonyl into the material simultaneously with the hydrogenating agent so that elementary liberation of nickel occurs in close contact with hydrogen and the substance to be hydrogenated. These advantages are that the proportion of catalyzer necessary for the reaction is very much reduced and the reaction proceeds much more rapidly.

My invention may be carried into effect in various ways. It is convenient to introduce nickel carbonyl into the hydrogen gas by passing a mixture of the latter with carbon monoxid over reduced nickel in the well known manner for making nickel carbonyl, and, of course, the nickel need not be the pure metal, a mixture containing nickel such as is usually employed being, for example, suitable. The mixture of gases need not be of great purity and may be made from water gas, or by the thermal decomposition of coal gas or of coke oven gas or of hydrocarbons of any kind. I have found, however, that the best results are obtained when the amount of carbon monoxid in the gases is limited to that requisite for forming the nickel carbonyl necessary for the reaction, and in any case the proportion of carbon monoxid in the mixture should not exceed 25 per cent. For example when an oil. such as a glycerid or a fatty acid is being hydrogenated, the simplest mode of operating consists in passing hydrogen containing 5–10 per cent. of carbon monoxid first through a volatilizer charged with reduced nickel in well known manner and then through the oil contained in a closed vessel heated to a suitable temperature, say from 200°–240° C. The gases passing away from the vessel are returned to the volatilizer to be used again, hydrogen or a gas rich therein being added to compensate for that absorbed by the oil. The proportion of nickel carbonyl required for the hydrogenation is very small; under proper conditions excellent results can be obtained with a proportion equivalent to 0.1 part of nickel to 100 parts of oil. The process is complete when a sample of the oil is found to have the desired solidifying point, iodin number or other property.

Another mode of operating consists in forcing the substance to be treated if it is in a liquid form through spraying nozzles into a gas-tight vessel which may be suitably heated to the temperature most favorable to the catalytic hydrogenation of the substance. I pass into the same container, preferably at or near the bottom, under suitable pressure, hydrogen gas containing metal carbonyl, for instance nickel carbonyl. The excess of gases leaves the vessel through an outlet at the upper part and may be returned into the gas circuit after the products it carries with it have been separated by condensing or washing. The treated liquid may be drained off and returned to the reaction vessel until hydrogenation has proceeded far enough. Instead of heating the reaction vessel or in addition to doing so, the liquid may be preheated in a suitable apparatus before entering the vessel to a temperature required for the reaction.

By another method of carrying out my invention I prepare a solution of metal carbonyl in the substance to be treated, such as by passing the gas or gases carrying nickel carbonyl through the cold substance, for instance an oil. Having prepared this solution of metal carbonyl in the substance to be treated, I press it through a spray nozzle into a heated vessel where it meets hydrogen or gases rich in hydrogen, whereupon hydrogenation readily occurs.

Figure 2:
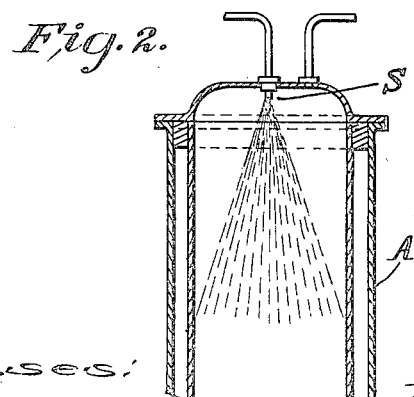

In the accompanying drawing:—Figure 1 is a diagrammatic view of an apparatus suitable for use in carrying out the present invention; and Fig. 2 represents a section of the upper portion of the hydrogenating vessel and illustrating a spraying nozzle through which the liquid to be treated may be forced.

In the drawing accompanying this specification, A is the vessel in which hydrogenation occurs. The substance to be hydrogenated is pumped through valve 1 by pump B from a supply tank (not shown) through a pre-heating coil C' contained in a tank C into vessel A which is heated in a suitable manner, such as by a steam jacket. The hydrogenated substance is forced by the pressure from vessel A through valve 2 into the tank containing coil C' where it is used as heating agent. If finished, it is run off through valve 3; if not finished, it is returned to pump B through valve 4. The gases enter by valve 5, are compressed by compressor D, and forced, by way of valve 6, through the volatilizer E, passing therein over reduced nickel. The gases issuing from volatilizer E and containing nickel carbonyl enter vessel A through valve 7. The gases left unabsorbed and now free from nickel issue from the vessel through outlet 8 and are passed through cooler F which they leave by valve 9 and can be either discharged through valve 10 or returned into circulation through valve 11. Any oil carried along with the gases is deposited in the cooler F and may be run off through valve 12.

If the compound to be treated is in the state of gas or vapor, as for instance in the hydrogenation of the more volatile tar oils, it is simply mixed with the hydrogen containing the nickel carbonyl and subjected to the temperature required for hydrogenation. Likewise in the case of a liquid some hydrogen may be mixed with the liquid, the spray being then preferably formed by injector action instead of by liquid pressure.

A spraying nozzle S, shown in Fig. 2, may be provided in the upper portion of the hydrogenating vessel and the liquid to be treated may be forced through this nozzle.

Having thus described my invention and the best means I know of carrying the same into practical effect, I claim:—

1. A process of catalytic hydrogenation which consists in spraying the substances to be hydrogenated into a heated space into which is simultaneously conducted a gaseous hydrogenating agent carrying nickel carbonyl.

2. A process of catalytic hydrogenation of fatty bodies which consists in dissolving nickel carbonyl in the fatty body and spraying this solution into a heated space containing a hydrogenating agent.

3. Process of catalytic hydrogenation which consists in continuously passing hydrogen containing carbon monoxid through previously reduced nickel and then through the substance to be hydrogenated while the latter is heated to a suitable temperature, and returning the carbon monoxid and non-absorbed hydrogen to said previously reduced nickel.

In testimony whereof I have signed my name to this specification in the presence of two subscribing witnesses.

RUDOLF LESSING.

Witnesses:
JOSEPH MILLARD,
WALTER J. SKERTEN.